United States Patent
Maeda et al.

(10) Patent No.: US 8,436,565 B2
(45) Date of Patent: May 7, 2013

(54) MOTOR CONTROLLER FOR TANDEM CONTROL

(75) Inventors: Kazuomi Maeda, Minamitsuru-gun (JP); Yukio Toyozawa, Minamitsuru-gun (JP); Yasusuke Iwashita, Minamitsuru-gun (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 701 days.

(21) Appl. No.: 12/566,827

(22) Filed: Sep. 25, 2009

(65) Prior Publication Data

US 2010/0181955 A1 Jul. 22, 2010

(30) Foreign Application Priority Data

Jan. 20, 2009 (JP) .................................. 2009-009634

(51) Int. Cl.
*H02P 7/00* (2006.01)

(52) U.S. Cl.
USPC ...... 318/432; 318/434; 318/560; 318/568.18; 318/632

(58) Field of Classification Search .................. 318/560, 318/569, 625, 34, 135, 632, 432, 434, 400.07, 318/400.23, 568.18, 652, 700, 721, 779, 318/799

See application file for complete search history.

(56) References Cited

U.S. PATENT DOCUMENTS

| 5,646,495 | A | * | 7/1997 | Toyozawa et al. | 318/625 |
|---|---|---|---|---|---|
| 6,534,944 | B2 | * | 3/2003 | Toyozawa et al. | 318/625 |
| 6,566,835 | B1 | * | 5/2003 | Yoshida et al. | 318/569 |
| 6,809,493 | B2 | * | 10/2004 | Iwashita et al. | 318/625 |
| 7,671,553 | B2 | * | 3/2010 | Terada et al. | 318/432 |
| 2010/0231158 | A1 | * | 9/2010 | Jonsson | 318/609 |

FOREIGN PATENT DOCUMENTS

| JP | 7-110714 | 4/1995 |
|---|---|---|
| JP | 8-16246 | 1/1996 |
| JP | 2003-79180 | 3/2003 |
| JP | 2003-189657 | 7/2003 |
| JP | 2004003677 | 1/2004 |

OTHER PUBLICATIONS

Japanese Notice of Reasons for Rejection mailed Jun. 1, 2010 issued in Japanese Application No. 2009-009634 (including a partial translation thereof).

* cited by examiner

*Primary Examiner* — Antony M Paul

(74) *Attorney, Agent, or Firm* — Drinker Biddle & Reath LLP

(57) ABSTRACT

In position tandem control in which one movable member is driven by two motors, an output of the integral element of the velocity control unit in the control system for one motor is copied to the integral element of the velocity control unit in the control system for the other motor. A preload is added to a torque command output from each of the velocity control units in the motor control systems for two motors so that torques in mutually opposite directions are generated to suppress backlash between gears.

2 Claims, 15 Drawing Sheets

MOTOR CONTROLLER FOR TANDEM CONTROL

RELATED APPLICATION DATA

This application claims priority under 35 U.S.C. §119 and/or §365 to Japanese Application No. 2009-009634 filed Jan. 20, 2009, the entire contents of which are incorporated herein by reference.

BACKGROUND OF THE INVENTION

1. Field of the Invention

The present invention relates to a motor controller that performs tandem control in which one driven body is driven by two motors.

2. Description of the Related Art

In a driving mechanism such as a robot or machine tool, when the movement axis cannot be accelerated or decelerated by one motor because a driven body to be moved is too big or when a driven body cannot be moved stably because backlash between the motor and the driven body is large, tandem control in which two motors receive commands and drive one driven body is used. There are two types of tandem control: torque tandem control and position tandem control.

U.S. Pat. No. 5,646,495 discloses the stabilization (dumping correction) of torque tandem control in which one axis is driven by two motors and the addition of a preload for suppression of backlash. FIG. 14 is a block diagram illustrating principal parts of a motor controller for the torque tandem control. The main motor (not shown) and sub motor (not shown) are driven by voltage commands from corresponding current control units.

The main motor is controlled by inputting a torque command Tc1', which is obtained by adding a preload torque Tp1' to a torque command sent from a velocity control unit, to a current control unit 13 of the main motor. The sub motor is controlled by adding a preload torque Tp2' to a torque command sent from the velocity control unit and inputting a torque command Tc2' obtained through a reverse unit to a current control unit 23 of the sub motor.

The preload torque Tp1' and the preload torque Tp2' are torque offsets to be added to torque commands computed and output by the velocity control units so as to maintain tension between one gear driven by the main motor and the other gear driven by the sub motor.

Japanese Patent Application Laid-Open No. 7-110714 discloses a method of controlling a position, velocity, and torque when one movable member is driven by a plurality of motors. Of the plurality of motors, one is a servo motor, which controls the position and velocity of the movable member, and the others are motors that can control torque, which are driven by a set torque command given.

Japanese Patent Application Laid-Open No. 2003-79180 discloses a motor controller that performs tandem control in which one movable part is driven by a master axis motor and a slave axis motor, wherein a torque arbitration value is computed by low-pass filtering of a difference between a torque command for the master axis motor and a torque command for the slave axis motor. The torque arbitration value obtained by the computation is added to the torque command for the slave axis motor, so that the torque command for the slave axis motor is gradually corrected to the torque command for the master axis motor.

U.S. Pat. No. 6,809,493 discloses a servo controller that performs tandem control in which one driven body is driven by a plurality of motors. As shown in FIG. 13, this servo controller includes position control units 11 and 21, velocity control units 12 and 22, current control units 13 and 23, current amplifiers 14 and 24, and velocity detector 17 and 27, for each motor. The servo controller further includes a velocity integrator sharing means 5 that makes the output value of an integral element of the velocity control unit 12 identical to the output value of an integral element of the velocity control unit 22. The same command is input to the control systems for two motors 15 and 25 used for tandem control and the output values of the integral elements of the velocity control units 12 and 22 are kept substantially identical to each other by the velocity integrator sharing means 5.

In the technique for adding a preload torque disclosed in U.S. Pat. No. 5,646,495, when backlash between gears of a tool machine or the like is large, a preload torque is added to the master motor and slave motor in torque tandem control to suppress the backlash. However, the preload torque is added in a step-like manner in this patent document, so a mechanical shock may occur during addition or removal of a preload torque.

As shown in FIG. 15, even if a preload torque is added in position tandem control, the reciprocal of the preload torque is accumulated in the velocity integrator and the output torque becomes 0. Therefore, it is impossible to suppress the backlash between gears.

SUMMARY OF THE INVENTION

An object of the present invention is to provide a motor controller that performs tandem control in which one driven body is driven by two motors and suppresses backlash between gears of a machine tool or the like by adding a preload torque to a torque command for each of the two motors.

The motor controller according to the present invention has two motors for driving one driven body, a position detector for detecting a position of the driven body, and a velocity detector for detecting a velocity of the driven body or the motor. The motor controller comprises a control system, for each of the two motors, that includes a a position control unit that computes a velocity command value, based on a position deviation value which is a difference between an identical position command value input from a host controller and a position feedback value fed back from the position detector, and outputs the computed velocity command value, a velocity control unit that receives the velocity command value output from the position control unit, computes a torque command based on the velocity command value thus received and a velocity feedback value fed back from the velocity detector by using an integral element and a proportional element, and outputs the computed torque command value, and a current control unit that controls a motor driving current based on the torque command value output from the velocity control unit The motor controller further comprises a means for making an output value of the integral element of the velocity control unit in the control system for one of the two motors identical to an output value of the integral element of the velocity control unit in the control system for another of the two motors, and a compensation unit that adds a preload torque value to each of the torque command values output from the velocity control units in the control systems for the two motors in order to suppress backlash between the two motors.

The compensation means may have a time constant circuit, allowing the preload torque value to be added to gradually increase based on a prescribed time constant.

The means for making the output values of the integral elements identical to each other may be an integral element sharing means for making identical the output value of the integral element of the velocity control unit in the control system for one of the two motors to the output value of the integral element of the velocity control unit in the control system for another of the two motors.

In the motor controller of the present invention that performs tandem control in which one driven body is driven by two motors, a preload torque is added to each of torque commands output from the velocity control units in the control systems for the two motors in a manner such that torques in mutually opposite directions are generated, thereby preventing backlash. In addition, although such addition of preload torque may cause the reciprocal of the preload torque to accumulate in the velocity integrator and make the output torque zero, thereby making it difficult to suppress the backlash between gears, such difficulty will be overcome by copying an output of the integral element of the velocity control unit in the control system for one motor to the integral element of the velocity control unit in the control system for the other motor, in the case of the present invention.

In addition, addition of a preload torque increasing gradually based on a prescribed time constant suppresses a mechanical shock caused by the addition of the preload torque.

BRIEF DESCRIPTION OF THE DRAWINGS

The purposes and advantages of the present invention, including those described above, will clarified by reference to the attached drawings in combination with the description of the embodiment presented below.

DETAILED DESCRIPTION OF THE PREFERRED EMBODIMENTS

Figure 1:
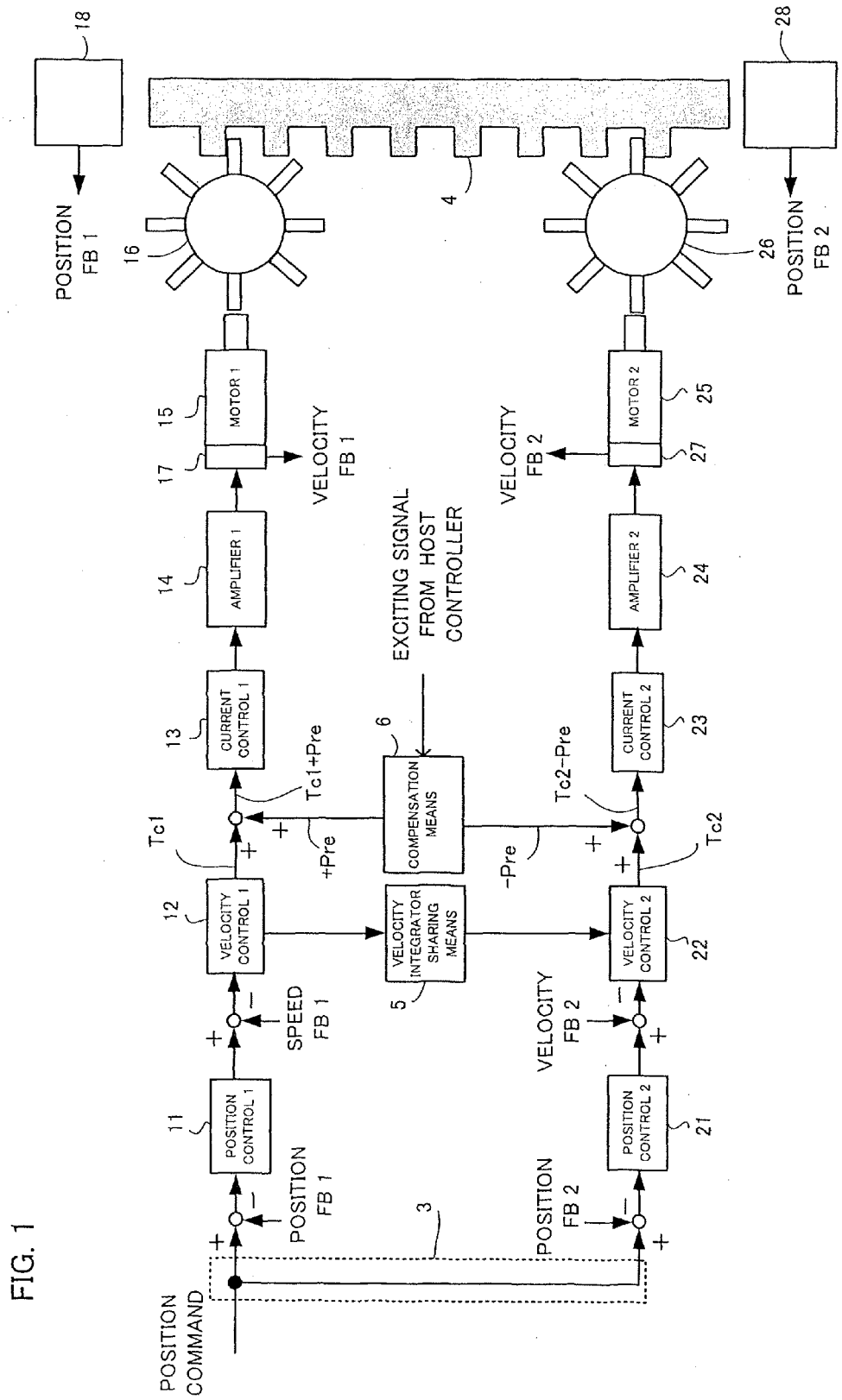
FIG. 1 is a block diagram illustrating a motor controller in which a preload torque is added, according to an embodiment of the present invention.

FIG. 1 is a block diagram illustrating a motor controller in which a preload torque is added, according to an embodiment of the present invention. This motor controller adds a preload torque in position tandem control and drives a driven body 4, which is one movable member, using two motors: a first motor 15 and a second motor 25.

A control system for controlling the first motor 15 has a position control unit 11 for position loop control, a velocity control unit 12 for velocity loop control, a current control unit 13, and a servo amplifier 14. In addition, the first motor 15 has a velocity detector 17 for detecting the rotating velocity of the motor and a position detector 18 for detecting the position of the driven body 4 is mounted on the first motor 15 side of the driven body 4.

A control system for controlling the second motor 25 has a position control unit 21 for position loop control, a velocity control unit 22 for velocity loop control, a current control unit 23, and a servo amplifier 24. In addition, the second motor 25 has a velocity detector 27 for detecting the rotating velocity of the motor and a position detector 28 for detecting the position of the driven body 4 is mounted on the second motor 25 side of the driven body 4.

One or both of the position detectors 18 and 28 may not be mounted on the driven body 4 due to lack of the rigidity of the driven body 4 or other reasons, and the velocity detectors 17 and 27 may be used instead. In some cases, only one of the position detectors 18 and 28 may be mounted. That is, one position detector may be mounted for each of a plurality of motors used for tandem control or only one position detector may be mounted for all of the plurality of motors. In addition, the position detector may be mounted on a motor output shaft or the like to detect the position of the driven body 4 by detecting the rotating position of the motor, or the position detector may be mounted directly on the driven body 4 to detect the movement thereof. A linear scale or rotary encoder may be used as the position detector.

The position control units 11 and 21 receive, from a host controller (not shown), the same (common) position command distributed by a command distributor 3, subtract position feedback amounts (position FB 1 and position FB 2) fed back from the position detectors 18 and 28 mounted on the driven body 4 from the received position command to obtain position deviation amounts, and compute and output velocity commands based on the obtained position deviation amounts. When one position detector is provided only for the driven body 4, the position feedback 1 and the position feedback 2 are set to be identical to each other.

The velocity control units 12 and 22 receive velocity commands from position control units 11 and 21, respectively, subtract, from the received velocity commands, velocity feedback amounts (velocity FB 1 and velocity FB 2) fed back from the velocity detectors 17 and 27 mounted on the motor to obtain velocity deviation amounts, perform velocity loop processing such as proportion or integration of the obtained position deviation amounts, and output the results. The velocity feedback amounts (velocity FB 1 and velocity FB 2) to be fed back to the velocity control units 12 and 22 may be detection values from a velocity detection means (not shown) that directly measures the movement velocity of the driven body 4.

The current control units 13 and 23 receive torque commands from the velocity control units 12 and 22, respectively, and subtract, from the received torque commands, current feedback amounts fed back from sensors for detecting a motor current to obtain current deviation amounts, and compute and output voltage commands based on the obtained current deviation amounts. The current feedback is not shown in FIG. 1.

The servo amplifiers 14 and 24 receive current commands from the current control units 13 and 23, generate driving currents for driving corresponding motors 15 and 25, and drive the motors 15 and 25, respectively. The driven body 4 is moved when pinions 16 and 26 are turned by the motors 15 and 25.

As described above, the motors 15 and 25 perform the loop control of the position, velocity, and current based on a position command common to the two motors and drive the driven body 4 by the resultant force of the output torques of the two motors.

A velocity integrator sharing means 5 is used to make the output value of an integral element of the velocity control unit 12 in the first motor control system identical to the output value of an integral element of the velocity control unit 22 in the second motor control system. A method of making the output value of an integral element of the velocity control unit 12 identical to the output value of an integral element of the velocity control unit 22 is, for example, (1) to switch the integral value of an integrator included in the velocity control unit 22 of the second motor control system to the integral value of an integrator included in the velocity control unit 12 of the first motor control system or (2) to provide the integrator only to the velocity control unit 12 of the first motor control system and input the output of the integrator to the velocity control unit 22 of the second motor control system.

The reason for using the velocity integrator sharing means 5 in the present invention will now be described below. In position tandem control, if acceleration/deceleration is repeated, due to a difference in capturing timing of velocity feedback data (velocity FB 1 and velocity FB 2) or quantization problems, one of the integral elements of velocity control units 12 and 22 gradually deviates in the plus direction while the other gradually deviates in the minus direction, thereby generating an excess torque command.

When only one position detector is provided and the position feedback amounts for the motors 15 and 25 are made identical to each other (position FB 1=position FB 2), (1) if there is only a small difference between the motor driving position and the position detected by the position detector because, for example, the position detector is mounted on the motor rotation shaft or near the motor driving mechanism, then a torque command is issued based on the value of the integral element of the velocity control unit in the motor control system and the detection value detected by the position detector of this type is fed back as position feedback, thereby resolving the deviation of the integral elements, (2) in a control system for a motor other than the motor referred to in the above (1), however, even if the integral element of the velocity control unit in the control system deviates in plus or minus direction, feeding back of the position feedback signal will not act to cancel such deviation, with the result that the integral value of the integral element is kept deviated and control is degraded, overheating the motor in some cases. To address this problem, the velocity integrator sharing means 5 is used for improving the deviation of the integral value of the integral element in the velocity control unit and preventing degradation of motor control due to the deviation of the integral value or occurrence of overheating.

Figure 2:
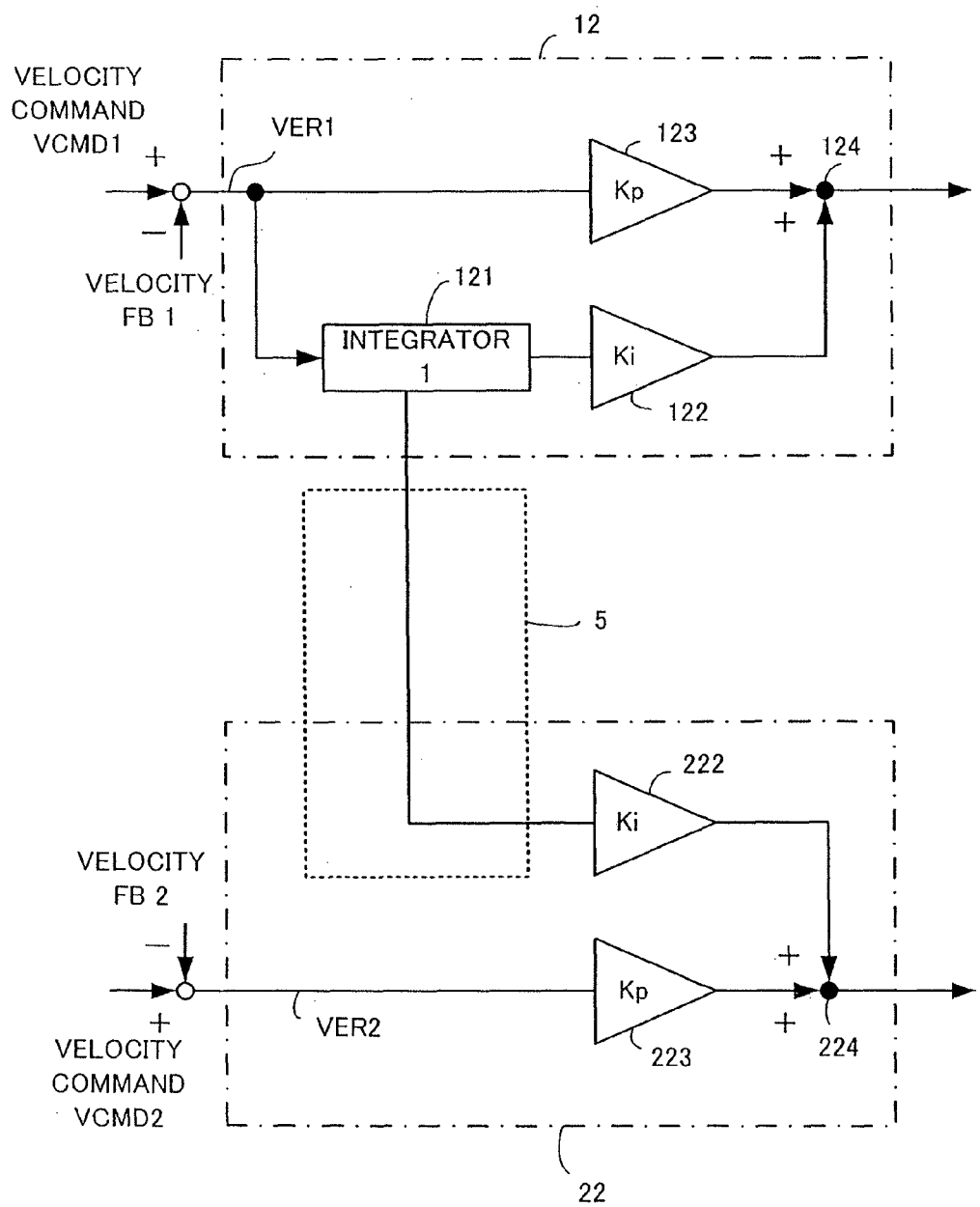
FIG. 2 shows an example of sharing an integrator between a velocity control unit in a first motor control system and a velocity control unit in a second motor control system.

FIG. 2 shows an example of sharing an integrator between the velocity control unit in the first motor control system and the velocity control unit in the second motor control system.

As shown in FIG. 2, an output of an integrator 121 of the velocity control unit 12 in the first motor control system is input to an integration amplifier 222 of the velocity control unit 22 in the second motor control system. In this configuration, an integral value can be shared between the velocity control unit 12 in the first motor control system and the velocity control unit 22 in the second motor control system.

This integrator 121 integrates a velocity deviation VER1, which is a difference between a velocity command VCMD1 (output of the position control unit 11 in the first motor control system) and the velocity feedback amount (velocity FB 1). An amplifier 122 of an integral gain Ki amplifies an output of the integrator 121. An amplifier 123 of a proportional gain Kp amplifies the velocity deviation VER1.

An amplifier 222 of an integration gain Ki of the velocity control unit 22 in the second motor control system amplifies an output of the integrator 121. An amplifier 223 of a proportional gain Kp amplifies a velocity deviation VER2, which is a difference between a velocity command VCMD2 (an output of the position control unit 21 in the second motor control system) and the velocity feedback amount (velocity FB 2).

In FIG. 1, a compensation means 6 generates a preload torque value according to an exciting signal from a host controller, adds a positive preload torque value +Pre to a torque command value output from the velocity control unit 12 in the first motor control system, and adds a negative preload torque value −Pre to a torque command value output from the velocity control unit 22 in the second motor control system.

The first motor 15 is controlled by inputting the torque command value (Tc1+Pre), which is obtained by adding the preload torque value +Pre to the torque command value Tc1 output from the velocity control unit 12, to the current control unit 13. The second motor 25 is controlled by inputting a torque command value (Tc2−Pre), which is obtained by adding the preload torque value Pre to the torque command value Tc2 output from the velocity control unit 22, to the current control unit 23.

These preload torque values +Pre and −Pre are fixed offsets to be added to the torque values Tc1 and Tc2, respectively, output by the velocity control units 12 and 22 so as to maintain tension between one gear driven by the first motor 15 and the other gear driven by the second motor 25. As shown in the example in FIG. 1, when the first motor 15 and the second motor 25 turn in the same direction, the preload torque values to be added to the output torque values Tc1 and Tc2 as offsets mutually have different signs (one is a positive preload value whereas the other is a negative preload value). When the first motor 15 and the second motor 25 turn in mutually opposite directions, the preload torque values to be added to the output torque values Tc1 and Tc2 as offsets have the same sign.

The preload torque values may be added to the output torque values Tc1 and Tc2 in stages or may be added while being increased gradually based on a prescribed time constant. If the preload torque values are added while being increased gradually based on a prescribed time constant, a mechanical shock can be suppressed. Accordingly, the compensation means 6 has a time constant circuit which allows the preload torque values to be added while being increased gradually based on a prescribed time constant.

Figure 3A:
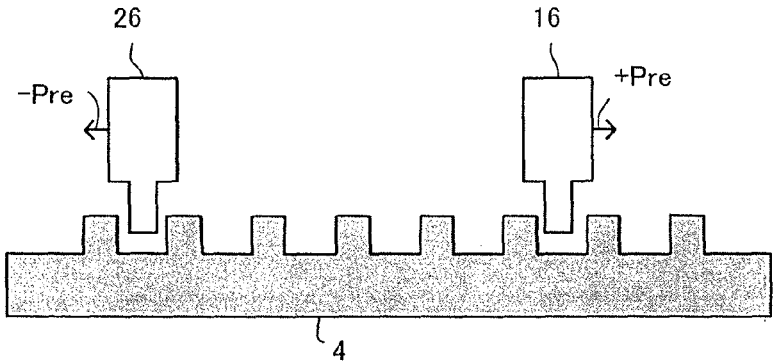
FIGS. 3A to 3C illustrate the gradual addition of a preload torque based on a prescribed time constant.
Figure 3B:
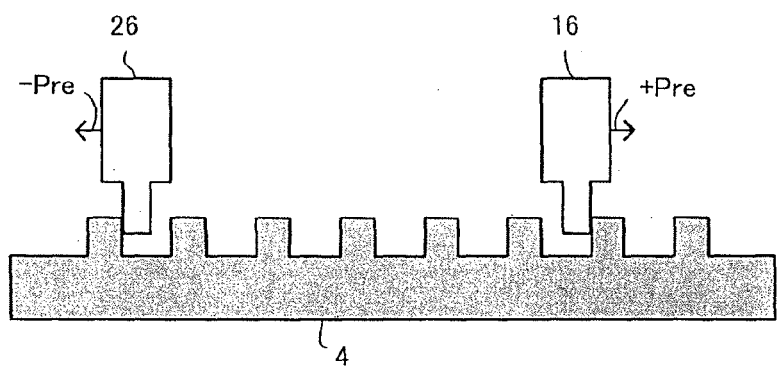
Figure 3C:
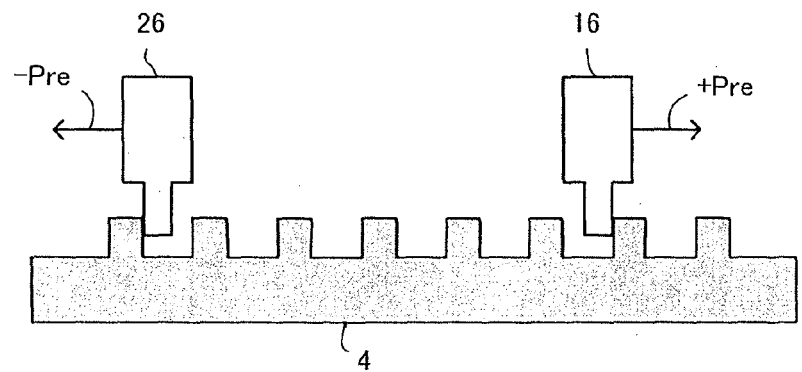

FIGS. 3A to 3C illustrate addition of the preload torque values based on a prescribed time constant. FIG. 3A shows a state in which the pinions 16 and 26 do not come into contact with the driven body 4 and the preload torque values +Pre and −Pre to be add are small. FIG. 3B shows a state in which the pinion 16 and 26 start coming into contact with the driven body 4 and the preload torque values +Pre and −Pre to be add are also small. FIG. 3C shows a state in which the pinions 16 and 26 have engaged with the driven body 4 and the preload torque values +Pre and −Pre to be add are larger. If the preload torque values to be added are increased gradually in this way based on a time constant, it is possible to ease a mechanical shock that occurs when the pinions 16 and 26 come into contact with the driven body 4.

FIGS. 4A to 4D show temporal changes in a preload torque value generated by the compensation means 6 in FIG. 1.

Figure 4A:
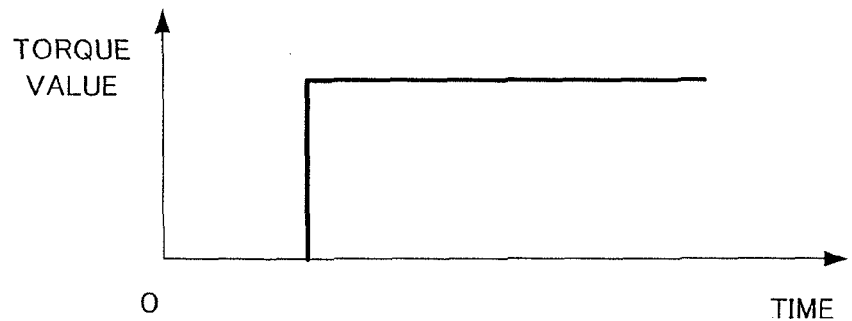
FIGS. 4A to 4D illustrate temporal changes in a preload torque value generated by the compensation means in FIG. 1.
Figure 4B:
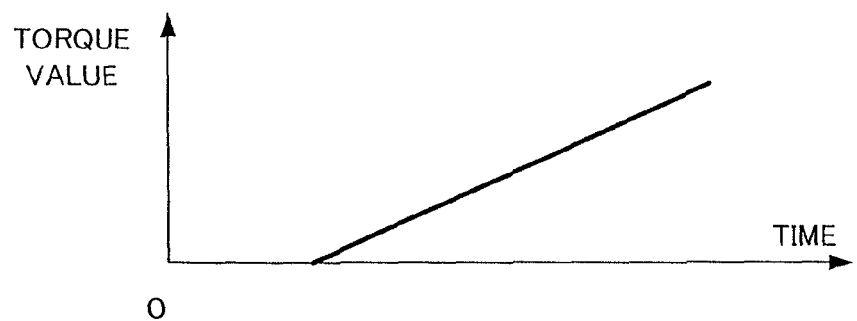
Figure 4C:
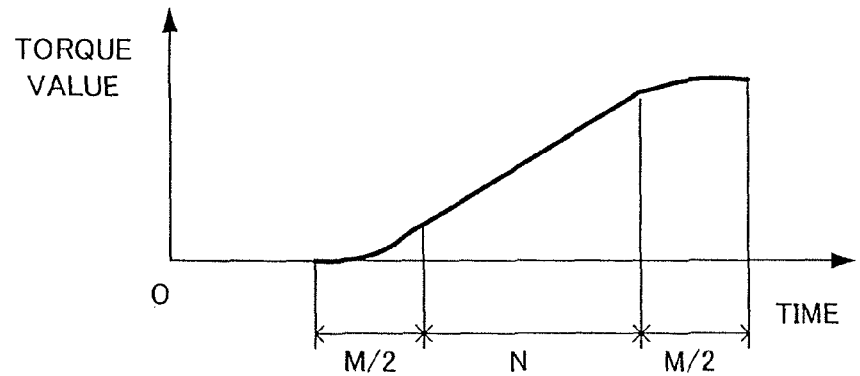
Figure 4D:
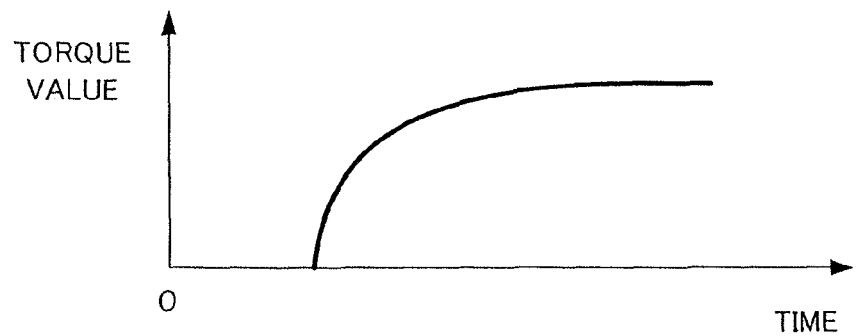

FIG. 4A shows an example of adding a preload torque in a step form. FIG. 4B shows an example of adding a preload torque in a ramp form. FIG. 4C shows an example of adding a preload torque in a double-linear form. FIG. 4D shows an example of adding a preload torque exponentially. The preload torques shown in FIGS. 4B to 4D are achieved by proving the time constant circuit for the compensation means 6 (see FIG. 1).

When removing the preload torques, the waveforms shown in FIGS. 4A to 4D are caused to fall, which is not illustrated.

Figure 5:
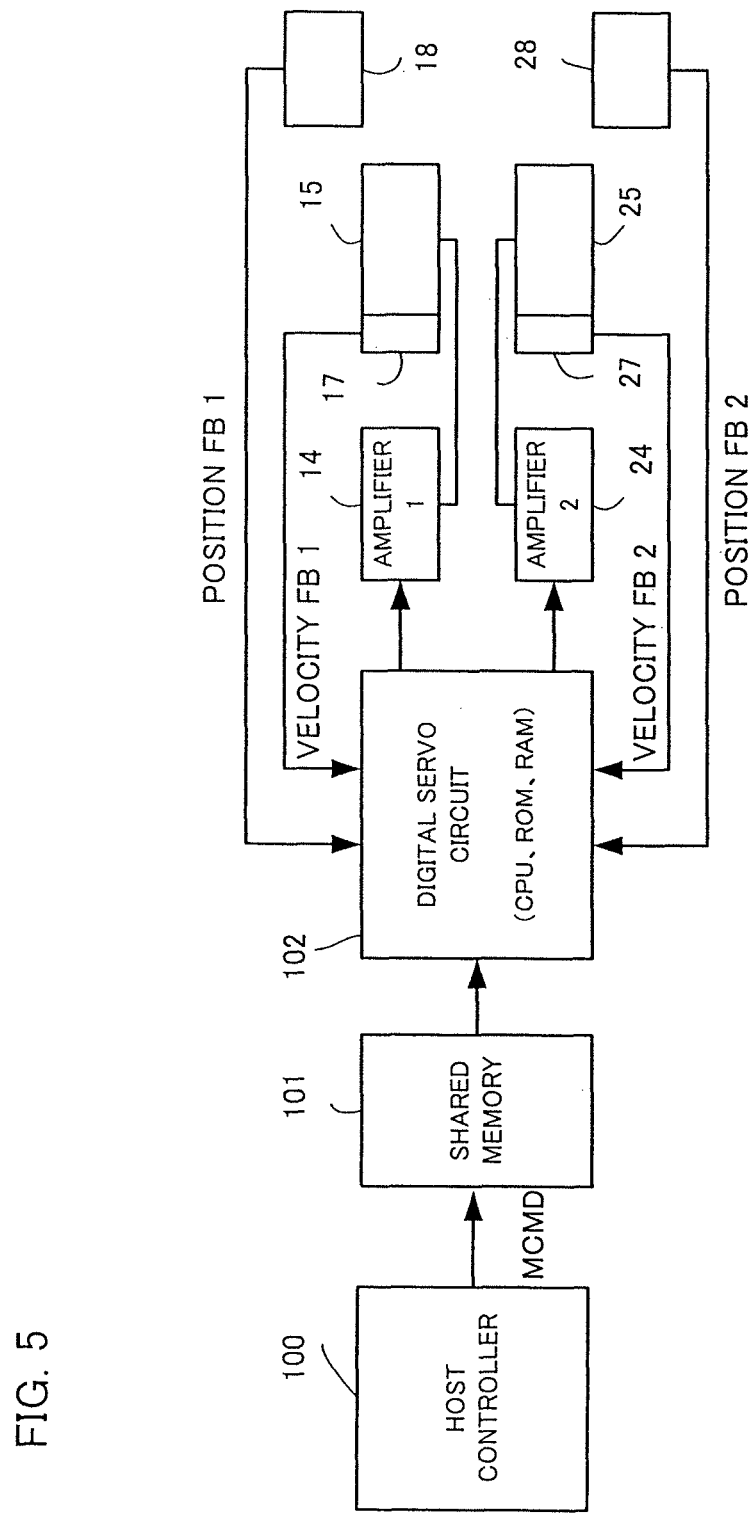
FIG. 5 is a block diagram illustrating the motor controller that performs position tandem control shown in FIG. 1.

FIG. 5 is a block diagram illustrating the motor controller that performs the position tandem control (see FIG. 1) described above. This figure shows the configuration only schematically, since the configuration is the same as in conventional servo controllers.

The motor controller has a numerical controller (CNC) 100 as a host controller, a shared memory 101, and a digital servo circuit 102 including a processor (CPU), a ROM, a RAM, and other components. The servo amplifiers 14 and 24 including transistor inverters and other components receive a voltage command from the digital servo circuit 102 and provide a motor driving current to the servo motors 15 and 25, which perform tandem control. The detection values from the velocity detectors 17 and 27 mounted on the servo motors 15 and 25 and the detection values from the position detectors 18 and 28, which detect the position of the driven body (movable member) or the positions of the servo motors 15 and 25, are fed back to the digital servo circuit 102.

The numerical controller 100 as a host controller outputs and writes, to the shared memory 101, a position command or a movement command MCMD, which is a difference between position commands, for the servo motor of each axis at every prescribed cycle according to an operation program or the like.

When tandem control of the servo motors 15 and 25 is performed by the motor controller shown in FIG. 5, the value of the position command or movement command MCMD for one servo motor 15 is made identical to the value of the position command or movement command MCMD for the other servo motor 25. The processor (CPU) of the digital servo circuit 102 reads the position command or movement command MCMD, performs the aforementioned position control, velocity control, and current control at every prescribed cycle, and drives the servo motors 15 and 25 through the servo amplifiers 14 and 24.

Figure 6:
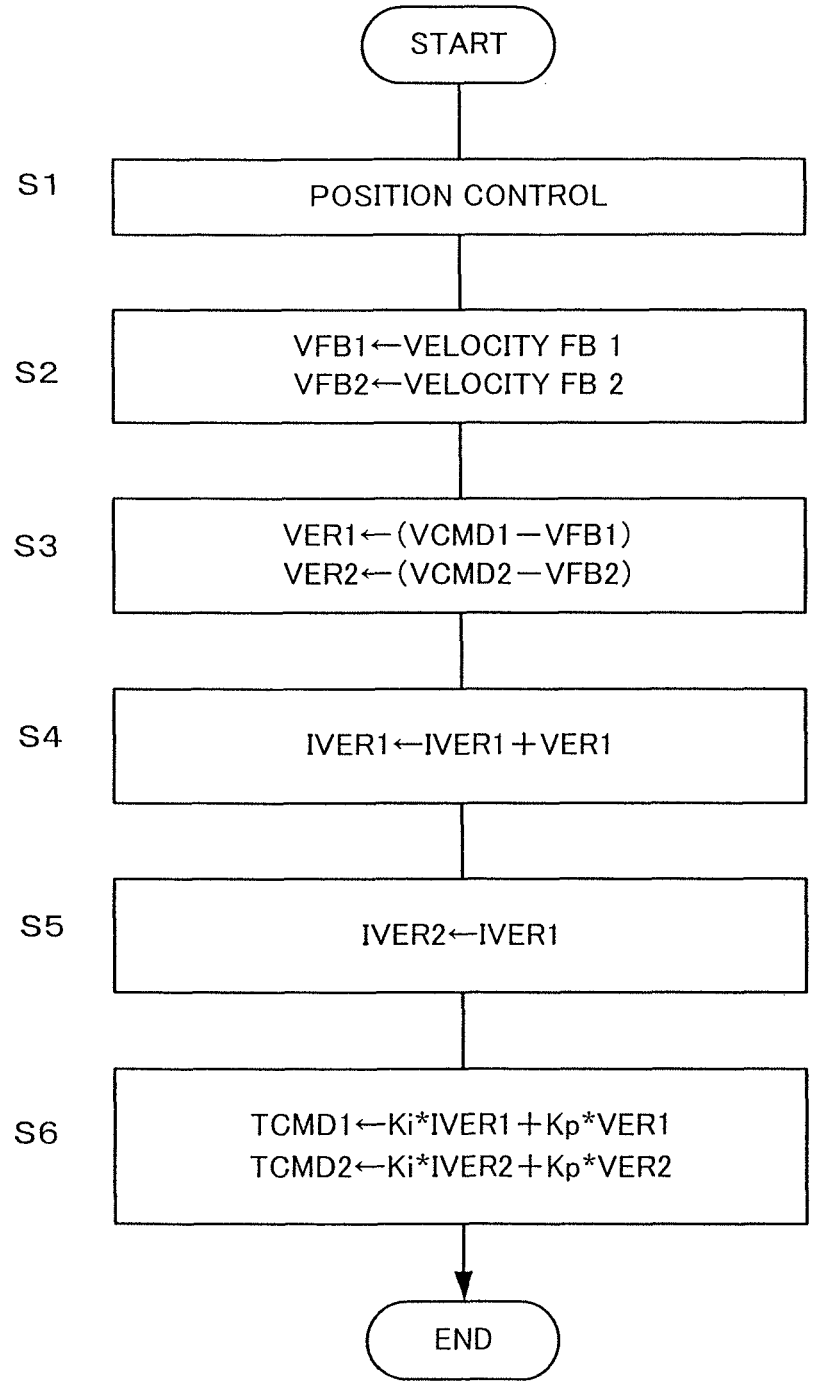
FIG. 6 is a flowchart illustrating a process performed at every position/velocity control cycle by a processor (CPU) of a digital servo circuit of the motor controller shown in FIG. 5 when the velocity integrator sharing means (see FIG. 1) is applied to the digital servo circuit.

FIG. 6 is a flowchart illustrating a process performed at every position/velocity control cycle by the processor (CPU) of the digital servo circuit 102 in FIG. 5 in case where the velocity integrator sharing means 5 (see FIG. 1) is applied to the digital servo circuit 102. The processing in each step will be described below.

[Step S1] The movement command MCMD specified by the host controller 100 is read, the position feedback amounts (position FB 1 and position FB 2) from the position detectors 18 and 28 are read, and position loop processing is performed as in prior art to obtain the velocity commands VCMD1 and VCMD2 for the motors 15 and 25.

[Step S2] The velocity feedback amounts (velocity FB 1 and velocity FB 2) fed back from the velocity detectors 17 and 27 are stored as VFB1 and VFB2, respectively.

[Step S3] The velocity feedback amounts VFB1 and VFB2 are subtracted from the velocity commands VCMD1 and VCMD2, which are obtained in position control in step S1, to obtain the velocity deviations VER1 and VER2.

[Step S4] The velocity deviation VER1 (the velocity deviation of the first motor control system) obtained in the step S3 is added to the register that stores the sum (the integral value IVER1 of the first motor control system) of the velocity deviations VER1 which has previously been obtained so that the register value is updated.

[Step S5] The integral value IVER2 of the second motor control system is rewritten to the register value (integral value IVER1) which has been updated in the previous Step S4.

[Step S6] The torque command (current command) TCMD1 of the first motor control system is obtained by expression TCMD1=Ki*IVER1+Kp*VER1, the torque command (current command) TCMD2 of the second motor control system is obtained by expression TCMD2=Ki*IVER2+Kp*VER2, the obtained current commands TCMD1 and TCMD2 are delivered to a current loop process, and the processing in the current position/velocity control cycle is completed. The processing in step S5 makes the integral value IVER2 of the second motor control system identical to the integral value IVER1 of the first motor control system.

Next, an algorithm of processing for causing a preload torque to rise or fall based on a prescribed time constant using the digital servo circuit 102 in FIG. 5 will be described with reference to FIGS. 7 to 12.

Figure 7:
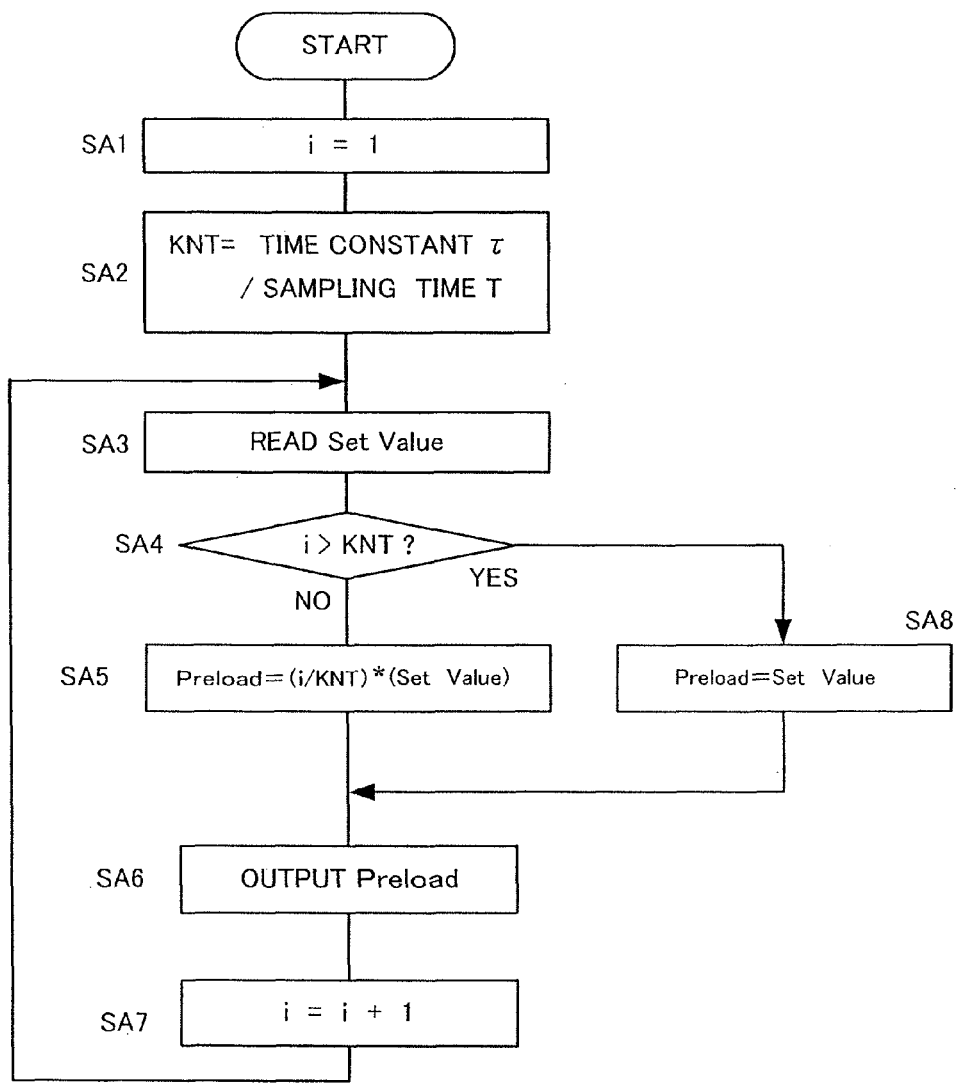
FIG. 7 is a flowchart illustrating an algorithm for causing a preload torque to rise in a ramp shape as shown in FIG. 4B.
Figure 8:
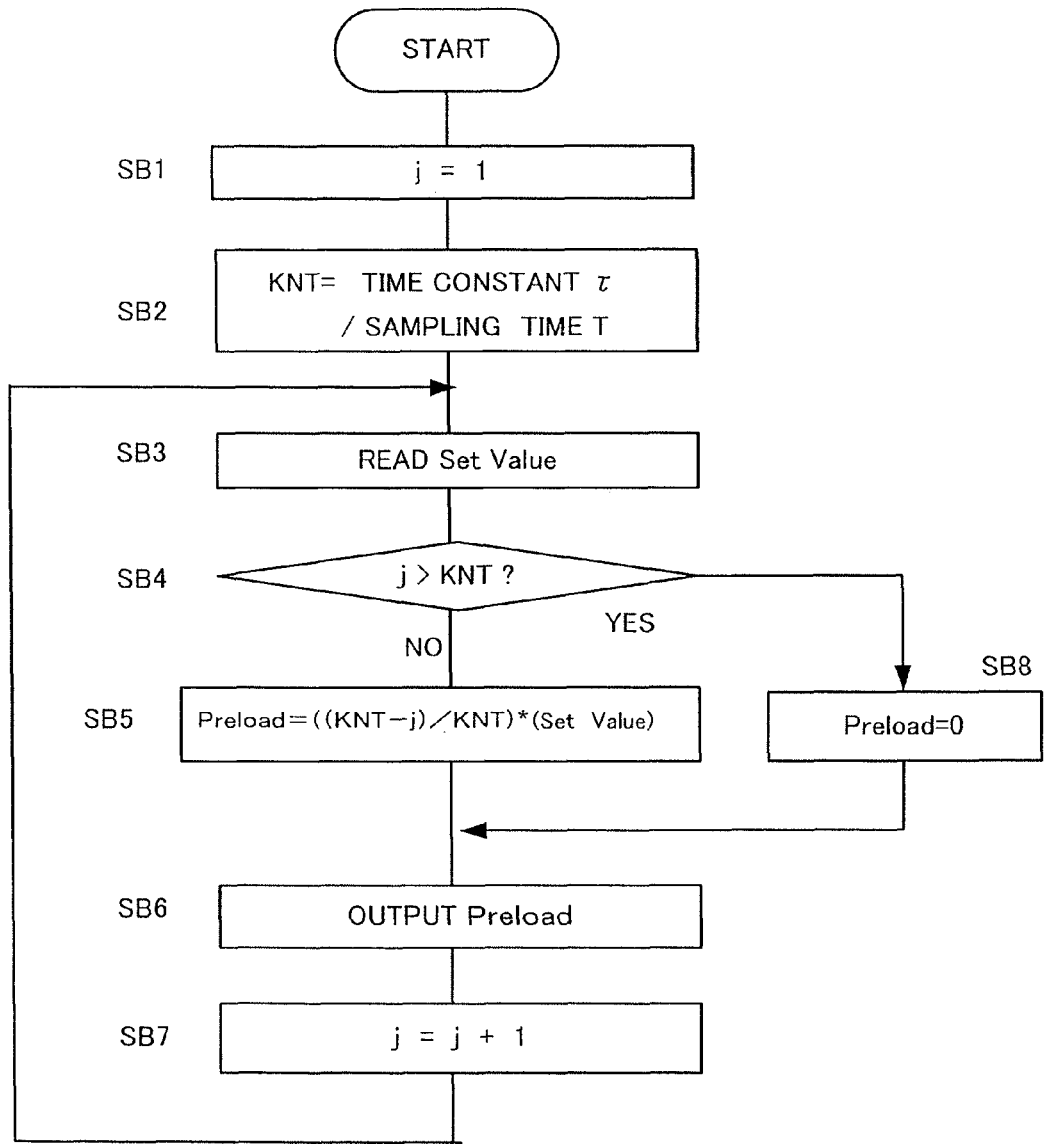
FIG. 8 is a flowchart illustrating an algorithm for causing a preload torque to fall in a ramp form.

FIG. 7 is a flowchart illustrating an algorithm of processing for causing a preload torque to rise in a ramp shape as shown in FIG. 4B; FIG. 8 is a flowchart illustrating an algorithm of processing for causing a preload torque to fall in a ramp form. The processing in FIG. 7 starts when the compensation means 6 (see FIG. 1) receives an exciting signal from a host controller; The processing in FIG. 8 starts when the compensation means 6 stops receiving the exciting signal.

First, the process for causing a preload torque to rise in a ramp shape will be described with reference to the flowchart in FIG. 7.

[Step SA1] An index i is initialized to 1.
[Step SA2] A time constant τ is divided by a sampling time T to obtain a number of repetition KNT.
[Step SA3] Set Value, which is the absolute value of the maximum value of a preload torque, is read from the digital servo circuit 102. This Set Value is stored in a storage means of the digital servo circuit 102.
[Step SA4] Whether the index i is greater than the number of repetition KNT or not is determined; if it is greater, then the processing proceeds to step SA8, otherwise the processing proceeds to step SA5.
[Step SA5] The preload torque value Preload is calculated using the expression Preload=(i/KNT)/(Set Value), where "i" is the value of the index i, KNT is the number of repletion, and Set Value is the value read in Step SA3.
[Step SA6] The preload torque value Preload obtained in step SA5 or SA8 is output.
[Step SA7] The previous index i incremented by 1, that is, (i+1), is renewed as the current index i and the processing returns to step SA3.

[Step SA8] The preload torque value Preload is set to Set Value read in step SA3. That is, when the index i exceeds the number of repetition KNT, the preload torque value Preload is set to Set Value read in step SA3.

Next, the processing for causing a preload torque to fall in a ramp shape will be described with reference to the flowchart in FIG. 8.

[Step SB1] An index j is initialized to 1.

[Step SB2] The time constant ti is divided by the sampling time T to calculate the number of repetition KNT.

[Step SB3] Set Value, which is the absolute value of the maximum value of the preload torque, is read from the storage means of the digital servo circuit 102.

[Step SB4] Whether the index j is greater than the number of repetition KNT or not is determined; if it is greater, then the processing proceeds to step SB8, otherwise the processing proceeds to step SB5.

[Step SB5] The preload torque value Preload is calculated using the expression Preload=((KNT−j)/KNT)*(Set Value), where "j" is the value of the index j, KNT is the number of repletion, and Set Value is the value read in Step SB3.

[Step SB6] The preload torque value Preload obtained in step SB5 or SB8 is output.

[Step SB7] The previous index j incremented by 1, that is, (j+1), is renewed as the current index j and the processing returns to step SB3.

[Step SB8] The preload torque value Preload is set to 0. That is, when the index j exceeds the number of repetition KNT, the preload torque value Preload is set to 0.

Figure 9:
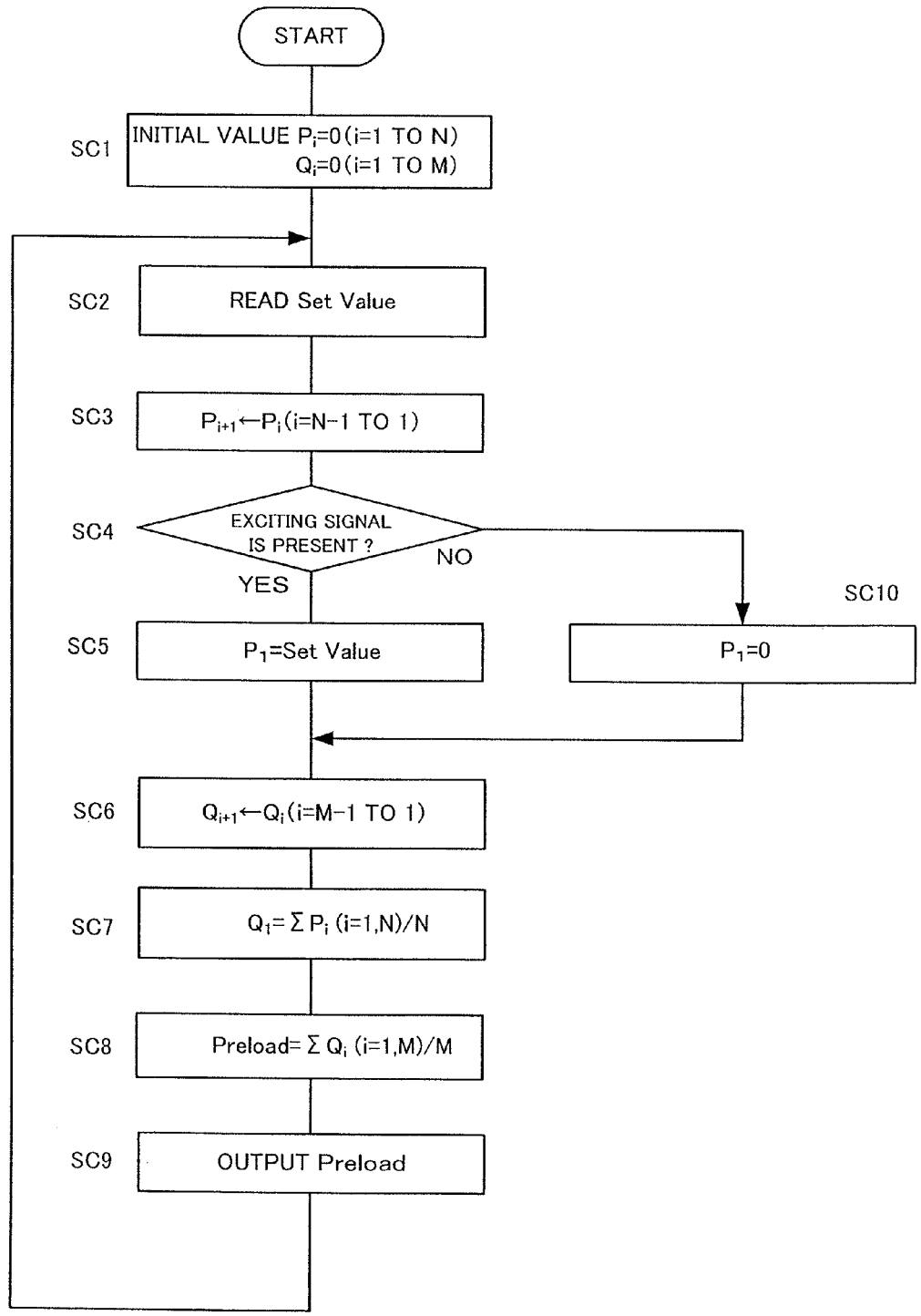
FIG. 9 is a flowchart illustrating an algorithm for adding a preload torque in a double-linear shape as shown in FIG. 4C.

Next, the process for adding a preload torque in a double-linear shape will be described with reference to the flowchart in FIG. 9.

[Step SC1] N sets of first registers Pi (i=1 to N) and M sets of second registers Qi (i=1 to M) are initialized to 0, where N plus M equals the number of repetition KNT (=time constant τ/sampling time T).

[Step SC2] Set Value, which is the absolute value of the maximum value of a preload torque, is read from the storage means of the digital servo circuit 102.

[Step SC3] The data items stored in the first registers $P_i$ (N=N−1 to 1) are shifted to registers $P_{i+1}$, each of which has an index 1 greater than the source, in descending order of the index. That is, the data item in register $P_{N-1}$ is shifted to adjacent register $P_N$, the data item in register $P_{N-2}$ to register $P_{N-1}$, ..., the data item in register $P_1$ to register $P_2$.

[Step SC4] Whether an exciting signal specifying addition of a preload is issued or not is determined. If it is issued, then the processing proceeds to step SC5, otherwise, the processing proceeds to step SC10.

[Step SC5] Set Value read in step SC2 is stored in register P1 and the processing proceeds to step SC6.

[Step SC6] The data items stored in the second registers $Q_i$ (i=M−1 to 1) are shifted to registers $Q_{i+1}$, each of which has an index 1 greater than the source, in descending order of the index. That is, the data item in register $Q_{M-1}$ is shifted to register $Q_M$, the data item in register $Q_{M-2}$ to register $Q_{M-1}$, ..., the data item in register $Q_1$ to register $Q_2$.

[Step SC7] The data items stored in the first registers $P_i$ (i=1 to N) are summed up and the result is divided by N, which is the number of the first registers, to obtain the data to be stored in the second register $Q_1$. That is, $Q_1$ is obtained by the equation $Q1=[P_1+P_2 \ldots +P_N]/N$.

[Step SC8] The data items stored in the second registers $P_i$ (i=1 to M) are summed up and the result is divided by M, which is the number of the second registers, to obtain the preload torque value Preload.

[Step SC9] The preload torque value Preload obtained in step SC8 is output and the processing returns to SC2.

[Step SC10] A value of 0 is stored in the register $P_1$.

Figure 10:
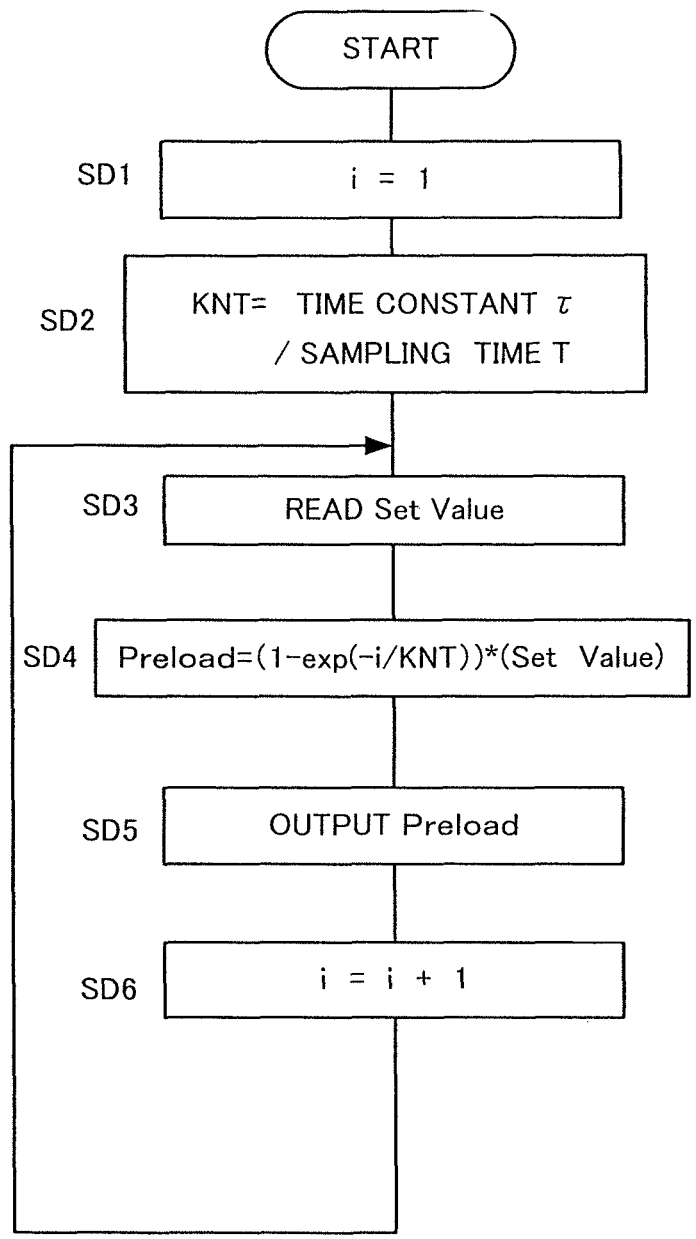
FIG. 10 is a flowchart illustrating an algorithm for causing a preload torque to rise exponentially as shown in FIG. 4D.
Figure 11:
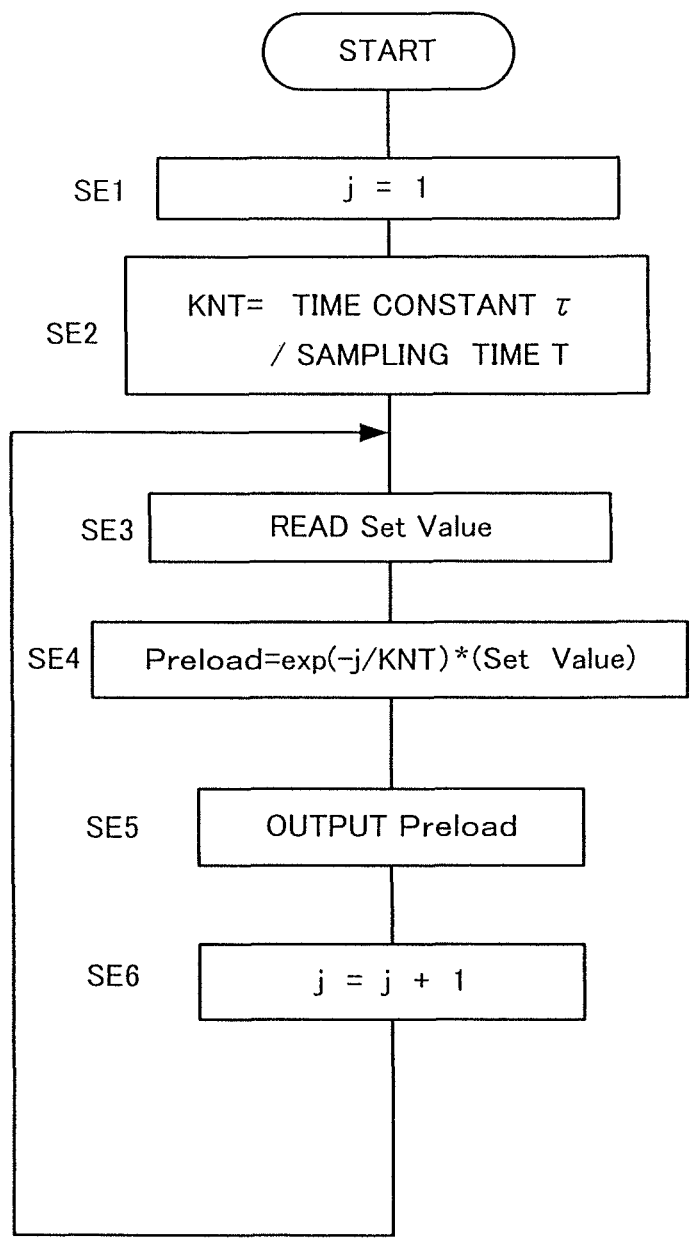
FIG. 11 is a flowchart illustrating an algorithm for causing a preload torque to fall exponentially.

FIG. 10 is a flowchart illustrating an algorithm of processing for causing a preload torque to rise exponentially as shown in FIG. 4D; FIG. 11 is a flowchart illustrating an algorithm of processing for causing a preload torque to fall exponentially. The processing in FIG. 10 starts when the compensation means 6 (see FIG. 1) receives an exciting signal from a host controller; The processing in FIG. 11 starts when the compensation means 6 stops receiving the exciting signal.

First, the processing for causing a preload torque to rise exponentially will be described with reference to the flowchart in FIG. 10.

[Step SD1] The index i is initialized to 1.

[Step SD2] The time constant τ is divided by the sampling time T to calculate the number of repetition KNT.

[Step SD3] Set Value, which is the absolute value of the maximum value of preload torque, is read from the storage means of the digital servo circuit 102.

[Step SD4] The preload torque value Preload is calculated by the equation Preload=(1−exp(−i/KNT))*(Set Value), where Set Value is the value read in step SD3, "i" is the value of index i, and KNT is the number of repetition calculated in step SD2.

[Step SD5] The preload torque value Preload calculated in step SD4 is output.

[Step SD6] The previous index i incremented by 1, that is, (i+1), is renewed as the current index i and the processing returns to step SD3.

Next, the process for causing a preload torque to fall exponentially will be described with reference to the flowchart in FIG. 11.

[Step SE1] The index j is initialized to 1.

[Step SE2] The time constant i is divided by the sampling time T to calculate the number of repetition KNT.

[Step SE3] Set Value, which is the absolute value of the maximum value of preload torque, is read from the storage means of the digital servo circuit 102.

[Step SE4] The preload torque value Preload is calculated by the equation Preload=exp(−j/KNT))*(Set Value), where Set Value is the value read in step SE3, "j" is the value of index j, and KNT is the number of repetition calculated in step SE2.

[Step SE5] The preload torque value Preload calculated in step SE4 is output.

[Step SE6] The previous index j incremented by 1, that is, (j+1), is used as the current index j and the processing returns to step SE3.

Figure 12:
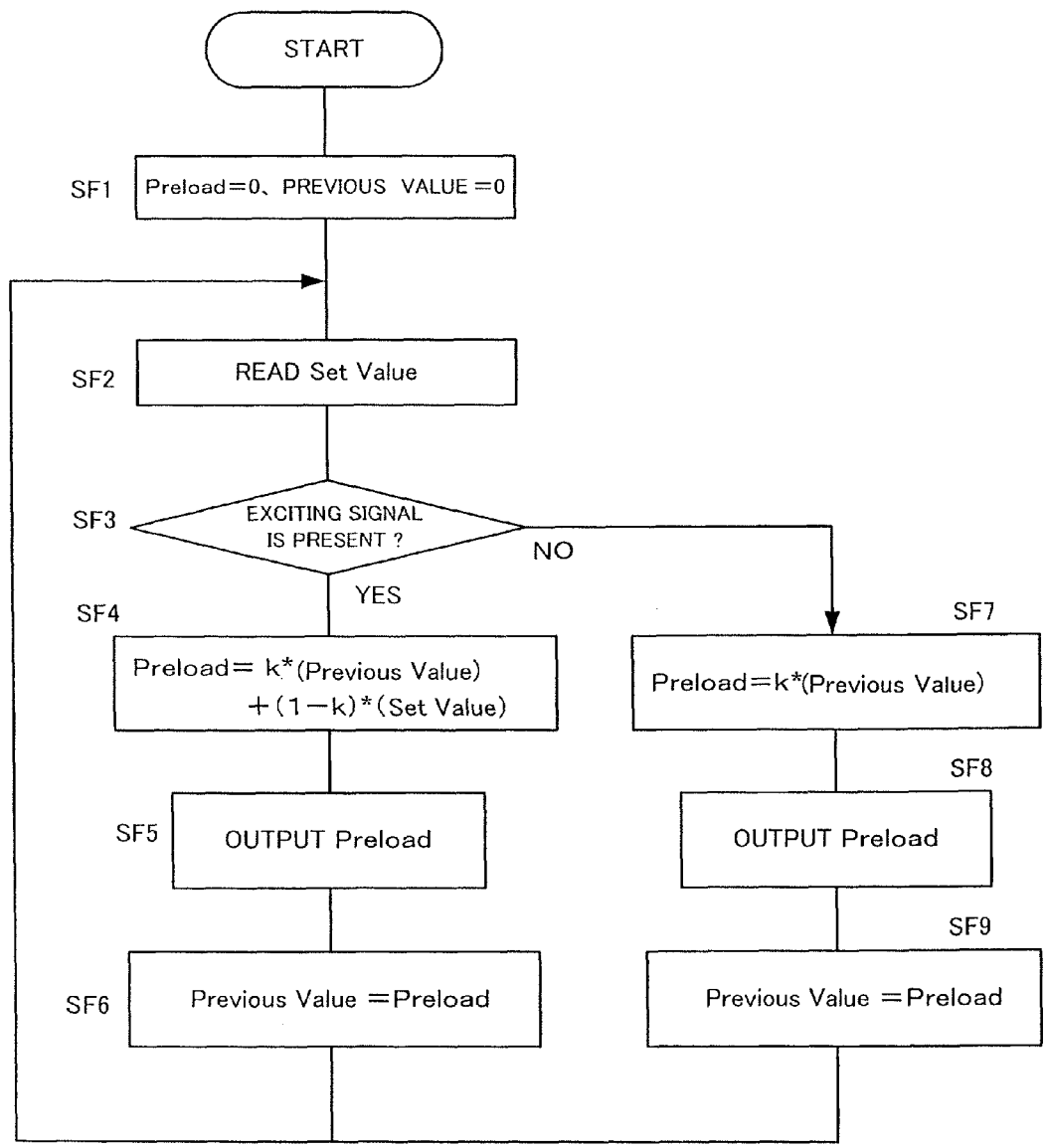
FIG. 12 is a flowchart illustrating an algorithm for causing a preload torque to rise or fall using a exponential function, where rise or fall of the preload torque is simply calculated.
Figure 13:
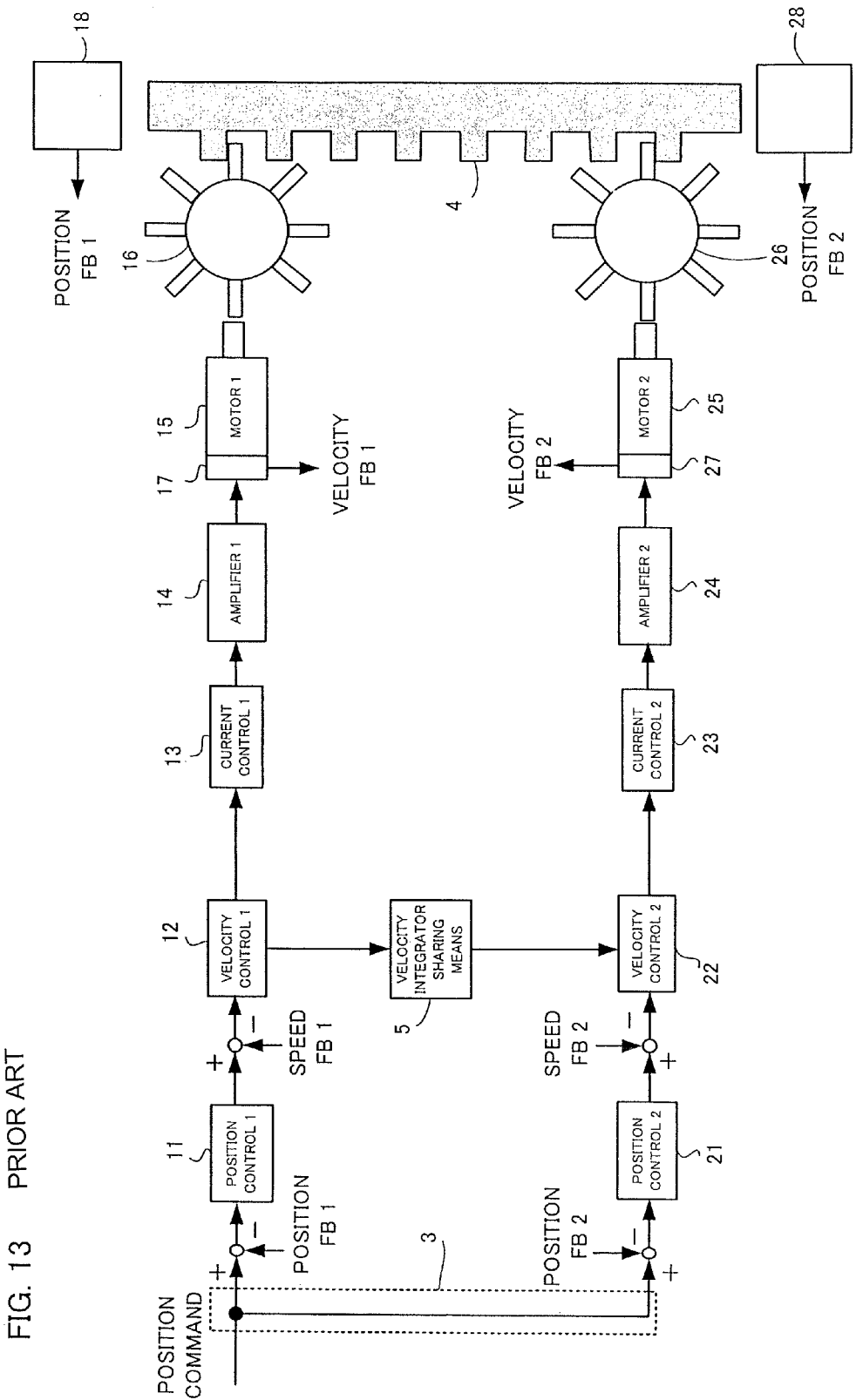
FIG. 13 illustrates conventional position tandem control.

FIG. 12 is a flowchart illustrating an algorithm of processing for causing a preload torque to rise or fall with a exponential function, in which rise or fall of such a preload torque is simply calculated.

[Step SF1] The preload torque value Preload and the register for storing Previous Value are initialized to 0.

[Step SF2] Set Value, which is the absolute value of the maximum value of a preload torque, is read from the storage means of the digital servo circuit 102.

[Step SF3] Whether an exciting signal specifying the addition of a preload is issued or not is determined. If it is issued, then the processing proceeds to step SF4, otherwise the processing proceeds to step SF7.

[Step SF4] The preload torque value Preload is calculated by the equation Preload=k*(Previous Value)+(1−k)*(Set Value), where Set Value is the value read in step SF2, Previous Value is the current value of Previous Value, and "k" is a prescribed coefficient (0<k<1).

[Step SF5] The preload torque value Preload obtained in step SF4 is output.

[Step SF6] The register for storing Previous Value is set to the preload torque value Preload that was output in step SF5 and the processing returns to step SF2.

[Step SF7] The preload torque value Preload is calculated by multiplying the current value of Previous Value by the aforementioned coefficient k.

[Step SF8] The preload torque value Preload obtained in step SF7 is output.

[Step SF9] The register for storing Previous Value is set to the preload torque value Preload that was output in step SF8 and the processing returns to step SF2.

In the processing shown in the flowcharts in FIGS. 7 to 12, when the motor 15 in the first control system and the motor 25 in the second control system turn in the same direction, positive and negative torque values (Pre+ and Pre−) are output to current control loops (current control units 13 and 23), respectively, so that tension between gears driven by the motors 15 and 25 is maintained. When the motor 15 in the first control system and the motor 25 in the second control system turn in mutually opposite directions, torque values with the same sign (Pre+ and Pre+, or Pre− and Pre−) are output to the current control loops (current control units 13 and 23). In the embodiment shown in FIG. 1, the motor 15 of the first control system and the motor 25 of the second control system turn in the same direction, so the sign of the preload torque value to be delivered to the current control unit 13 of the first control system is different from the sign of the preload torque value to be delivered to the current control unit 23 of the second control system.

Figure 14:
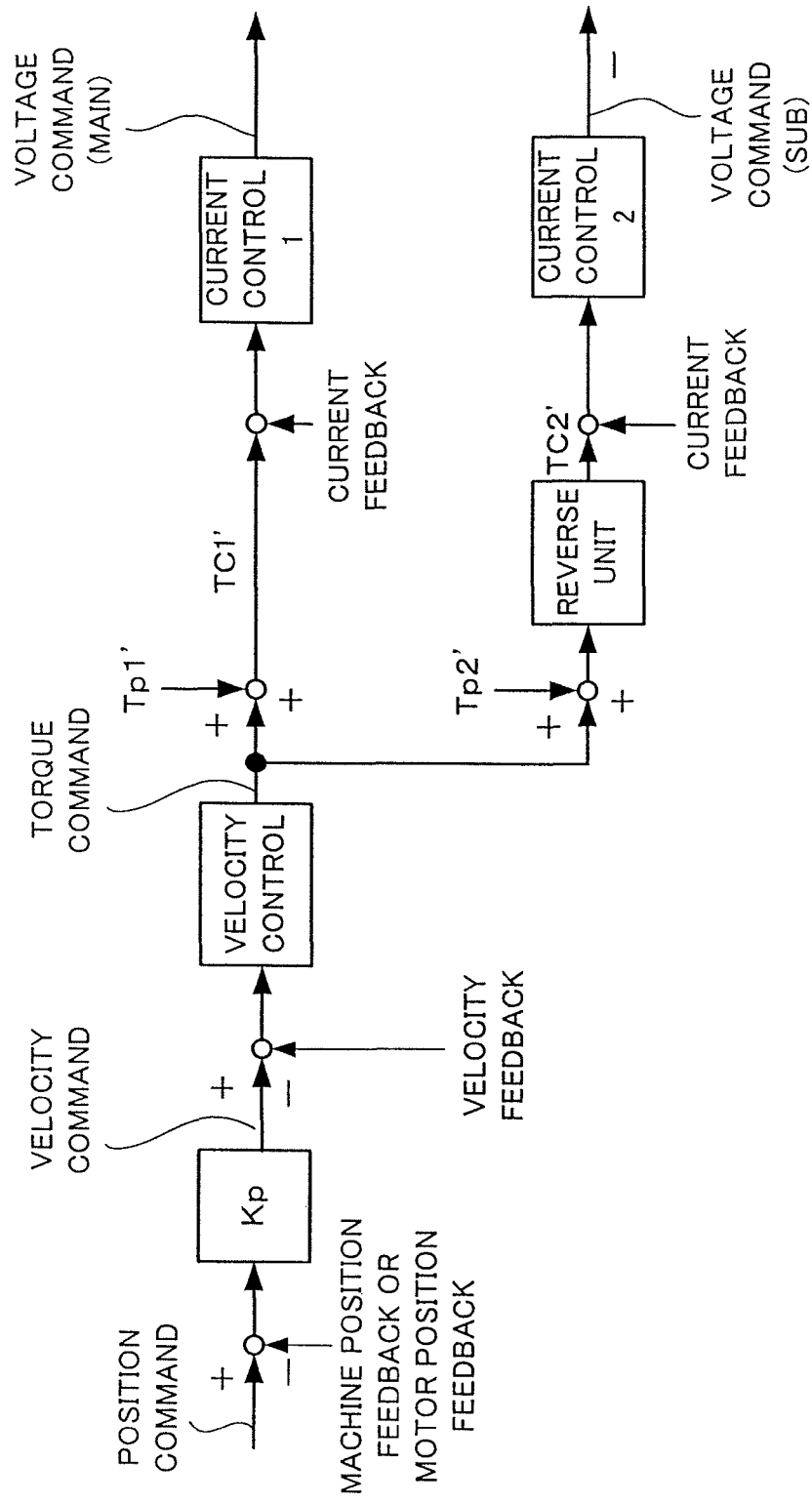
FIG. 14 illustrates conventional torque tandem control.
Figure 15:
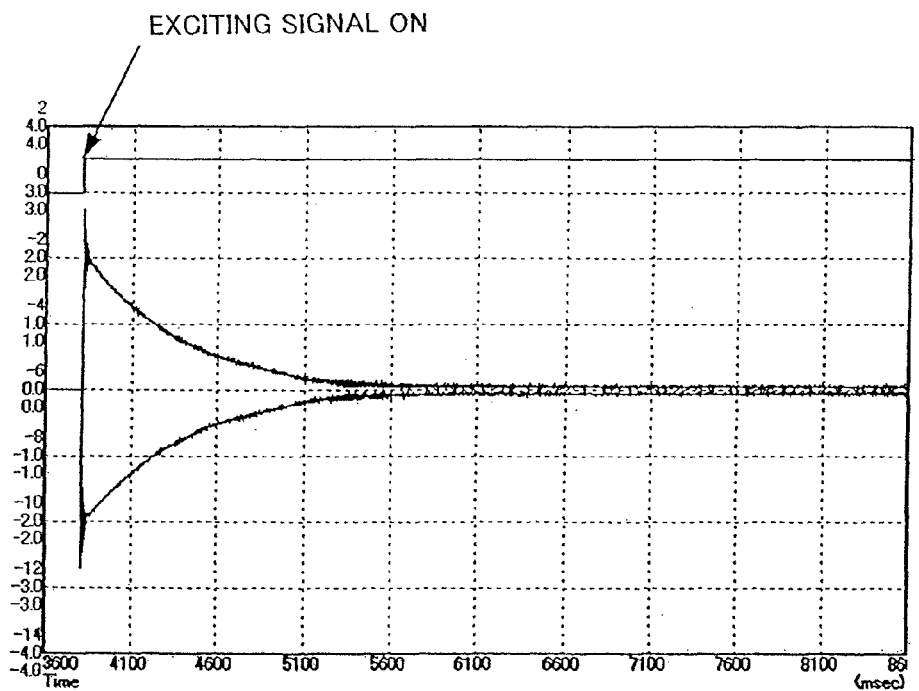
FIG. 15 illustrates addition of a preload in conventional position tandem control.

In addition, in a motor controller that performs the torque tandem control in FIG. 14, the correction means 6 with the time constant circuit can also be used to prevent backlash.

Figure 16:
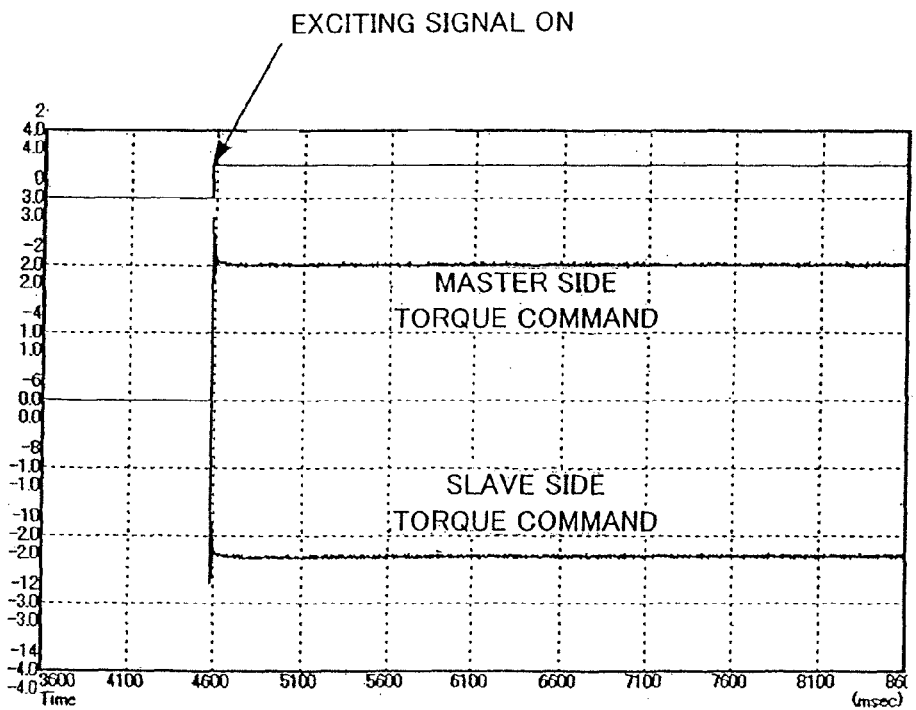
FIG. 16 illustrates addition of a preload torque with velocity integral values made identical in position tandem control by the motor controller according to the present invention.

According to the present invention, if a preload is added in a state where the velocity integral values are made identical to each other in position tandem control as shown in FIG. 16, an output torque is not set to 0, thereby allowing a backlash between gears of machine tools or the like to be suppressed.

What is claimed is:

1. A motor controller having two motors for driving one driven body, a position detector for detecting a position of the driven body, and a velocity detector for detecting a velocity of the driven body or the motor, the motor controller comprising:

a control system, for each of the two motors, that includes
a position control unit that computes a velocity command value, based on a position deviation value which is a difference between an identical position command value input from a host controller and a position feedback value fed back from the position detector, and outputs the computed velocity command value,
a velocity control unit that receives the velocity command value output from the position control unit, computes a torque command based on the velocity command value thus received and a velocity feedback value fed back from the velocity detector by using an integral element and a proportional element, and outputs the computed torque command value, and
a current control unit that controls a motor driving current based on the torque command value output from the velocity control unit;
a means for making an output value of the integral element of the velocity control unit in the control system for one of the two motors identical to an output value of the integral element of the velocity control unit in the control system for another of the two motors; and
a compensation unit that adds a preload torque value to each of the torque command values output from the velocity control units in the control systems for the two motors in order to suppress backlash between the two motors, wherein the compensation unit has a time constant circuit, allowing the preload torque value to be added to gradually increase based on a prescribed time constant.

2. The motor controller according to claim 1, wherein the means for making the output values of the integral elements identical to each other is an integral element sharing means for making identical the output value of the integral element of the velocity control unit in the control system for one of the two motors to the output value of the integral element of the velocity control unit in the control system for another of the two motors.

* * * * *